United States Patent [19]

Kuehnle

[11] Patent Number: 4,460,297

[45] Date of Patent: Jul. 17, 1984

[54] ORBITAL METHOD AND APPARATUS FOR MAKING HELICAL RACES

[76] Inventor: Manfred R. Kuehnle, 6 Linmoor Ter., Lexington, Mass. 02173

[21] Appl. No.: 354,342

[22] Filed: Mar. 3, 1982

[51] Int. Cl.³ .............................................. B23D 7/00
[52] U.S. Cl. ................................ 409/293; 51/48 HE; 51/291; 409/132; 409/168; 409/307; 409/314
[58] Field of Search .................... 409/142, 143, 66, 73, 409/76, 77, 199–201, 132, 168, 293, 307, 314; 51/48 HE, 95 R, 291

[56] References Cited

U.S. PATENT DOCUMENTS

| | | | |
|---|---|---|---|
| 2,638,136 | 5/1953 | Miller | 409/199 X |
| 3,745,712 | 7/1973 | Hajsman | 51/33 W |
| 3,916,569 | 11/1975 | Wydler et al. | 51/33 W |
| 4,028,992 | 6/1977 | Kuehnle | 409/167 X |

FOREIGN PATENT DOCUMENTS 141279 4/1980 Fed. Rep. of Germany ...... 409/143

*Primary Examiner*—William R. Briggs
*Assistant Examiner*—Lawrence Meier
*Attorney, Agent, or Firm*—Cesari and McKenna

[57] ABSTRACT

Cutting apparatus forms helical races in a workpiece defining a toroidal envelope having an axis of symmetry and a circular axis perpendicular to the axis of symmetry and defining a diametric plane through the envelope by rotating the workpiece about the axis of symmetry and continuously rotating a cutting tool about a second axis perpendicular to the axis of symmetry and coincident with the circular axis in synchronism with the workpiece rotation so as to form a series of helical grooves which extend all around the envelope. As the cutting tool is swung from the entrance end of each groove toward the diametric plane, the tool is rotated through a selected angle in one direction about its own longitudinal axis and, as the tool is swung from said diametric plane toward the exit end of each groove, it is rotated through said angle in the opposite direction about its said axis so as to produce a non-varying groove geometry when measured rectilinearly to the tangent of the lead angle of the groove. Provision is also made for increasing the distance between the tool cutting edge and the second axis when the tool is out of contact with the workpiece so as to increase the cut depths of the grooves.

11 Claims, 5 Drawing Figures

ORBITAL METHOD AND APPARATUS FOR MAKING HELICAL RACES

This invention relates to orbital method and means for making helical races. It relates more particularly to an improved technique for machining helical races having a uniform cross section in a curved workpiece and particularly a toroidal workpiece.

BACKGROUND OF THE INVENTION

Applicant has developed a transmission which transmits power from an input shaft to an output shaft by way of a multiplicity of circular bearing units driven by a worm on the output shaft and whose bearings follow spaced-apart helical races inscribed in a wall of a toroidal enclosure. A transmission such as this is disclosed in my U.S. Pat. No. Re. 26,476.

It has been found that considerable care must be taken in fabricating the toroidal enclosures for such transmissions so that the races inscribed in the enclosures have uniform cross section and relative pitch along their entire lengths. It should be understood at the outset that it is imperative that the toroidal helical races in such transmissions be extremly uniform and precisely related to the axis of the helix which coincides with the axis of rotation of the worm in order for the transmission to function properly. Without these constraints, the bearings are loaded unevenly contributing to excessive bearing wear. Further, certain bearings in the bearing units begin to disengage from the driving worm at certain times. These "loose" bearings begin to trail the others as they are not rotated enough with the result that they tend to "buck" the advancement of the bearing units within the housing.

Relatively recently, apparatus has been developed for making such races which employs a cutting machine that performs a double rotation of a tool and the toroidal workpiece about orthogonal axes. The rotations are synchronized so that the tool is maintained at a relatively uniform attack angle relative to the workpiece as the races are formed with the result that the races have a relatively uniform cross section along their lengths. Such apparatus is disclosed in my U.S. Pat. No. 4,028,992.

That prior apparatus supports the workpiece on a rotary worktable which turns about a vertical axis. The cutting tool is supported above the worktable by a rotary yoke which turns about a horizontal axis. The worktable and yoke operate together so that, when the worktable is turned, the cutting tool is swung through an arc whose radius corresponds to the radius of the helical races being formed in the workpiece. The pitch of the races, on the other hand, is determined by the ratio between the advance of the worktable and the advance of the yoke.

While that prior apparatus simplifies the formation of uniform helical races in toroidal transmissions of the type described in my patent, it does have certain drawbacks which have limited the wider use and application of that prior apparatus. More particularly, that apparatus is somewhat slow and cumbersome. This is mainly because it is basically a reciprocating step-and-repeat milling machine. That is, the machine's milling tool proceeds slowly along each helical groove, milling that groove to size in one or a plurality of passes following which the tool returns to its initial position and the stator is rotated to the next groove where the milling process is repeated. The removal rate of metal using that milling technique is relatively slow. Furthermore, the milling process results in considerable heating of the worktool and the workpiece/milling locale. Therefore, the milling process has to proceed fairly slowly in order to avoid overheating those parts.

Also, the transmission stator which contains the helical grooves or races is invariably formed as mating upper and lower sections, with the upper half of each race being contained in the upper section and the lower half of the same race being inscribed in the lower section. The prior apparatus for making such workpieces is disadvantaged in that it can only work on one section at a time. This sometimes results in there being discontinuities in the races at the interface joint where the upper and lower sections meet. Unless these discontinuities are removed by a time-consuming hand-finishing operation, they may cause irregularities in the rolling or rotary movements of the transmission bearing units which, in turn, may cause uneven rotary motion of the transmission output shaft.

SUMMARY OF THE INVENTION

Accordingly, the present invention aims to provide an improved method of inscribing accurately formed helical races in a curved workpiece.

Another object of the invention is to provide a method of making such races having a uniform cross section.

Still another object of the invention is to provide a method of inscribing helical races in a toroidal enclosure in a continuous fashion in a minimum amount of time.

Another object of the invention is to provide a method of this type which minimizes discontinuities in the inscribed helical races.

A further object of the invention is to provide such apparatus which cuts geometrically correct helical grooves relatively quickly and efficiently.

Another object is to provide apparatus of this type which is able to form the grooves simultaneously in both halves of a toroidal transmission stator.

Yet another object is to provide such apparatus which cuts races without generating undue heat in the workpiece or in the apparatus cutting tool.

Other objects will, in part, be obvious and will, in part, appear hereinafter.

The invention accordingly comprises the several steps and the relation of one or more of steps with respect with each of the others, and the apparatus embodying the features of construction, combination of elements and arrangement of parts which are adapted to effect such steps, all as exemplified in the following detailed description, and the scope of the invention will be indicated in the claims.

Briefly, the present method and apparatus are particularly suitable for forming helical grooves or races in a toroidal enclosure comprising upper and lower sections of a transmission stator. The stator has an axis of symmetry as well as a circular axis perpendicular to the axis of symmetry and which defines a diametric plane through the enclosure that coincides with the interface joint between the stator sections.

The apparatus includes a rotary worktable for holding the two stator sections or halves in a clamped together condition and a cutting head which is positioned within the stator enclosure. The cutting head is centered on the axis of symmetry and carries one or more orbiting members which rotate about an axis which is tangent to the circular axis. Each orbiting member carries a tool-receiving holder which extends perpendicular to the orbital axis so that the working end of the tool engages the grooves in the toroidal workpiece.

The orbiting members and the workpiece holder are rotated about their orthogonal axes, which rotations are synchronized so that the tool follows a helical path or track in the toroidal stator enclosure that has a semicurcular cross section or profile.

Means are also provided for rotatively oscillating each tool holder about its own longitudinal axis in its orbiting member as the cutting tool proceeds along each groove so as to increase the tilt angle of the tool from the entrance end of the groove to the middle of the groove and then to decrease that angle steadily from the middle to the exit end of the groove. This produces a groove geometry which never varies when measured rectilinearly to the tangent of the lead angle of the groove.

Also, with such a controlled rocking motion of the tool holder, the tilt angle of the cutting tool can be altered deliberately to slightly widen each groove at the ends of the groove so that, when the stator workpiece is used in a toroidal transmission, the flared ends of the groove or races provide smooth entry and exit of the transmission rotary bearing units.

Thus, as the orbiting member and workpiece rotate about orthogonal axes continuously in synchronism, each tool rocks back and forth about its longitudinal axis during its engagement with the workpiece so as to precisely cut a succession of geometrically correct helical grooves during successive orbits of the orbiting member. Furthermore, the apparatus includes means for advancing each tool out of its holder in increments following each rotation of the worktable so as to increase the depths of the grooves until the desired groove depth is reached.

Since the profile of the toroidal enclosure is semicircular and since each cutting tool orbits continuously, the tool is out of contact with the workpiece approximately 50% of the time. Therefore, neither the tool nor the workpiece/cutting locale are heated excessively. This means that the velocity with which the tool can move through its orbit is much greater than the speed of a rotary milling tool such as disclosed in my aforementioned U.S. Pat. No. 4,028,992. Moreover, each tool has a much longer life expectancy.

Apart from achieving much greater cutting speed, my new method and apparatus produce helical grooves or races with the necessary precision in terms of pitch lead angle and profile such that, in a toroidal transmission incorporating a stator made this way, each rotary bearing unit contacts the helical grooves in the stator with equal force so that the load is shared equally amongst those bearing units.

The speed and efficiency with which grooves can be formed in toroidal stator workpieces using my technique are maximized also because grooves can be formed in the upper and lower stator section simultaneously, rather than sequentially as is the case with the prior apparatus. Further, since both stator sections are processed together, there are no irregularities or discontinuities at the interface joint between the stator sections.

In summary, then, when toroidal transmission stators are made using this technique, the precisely formed grooves or races in the stator enable the bearing units in the transmission to share the applied load equally. Consequently, bearing wear is minimized so that such transmissions operate at maximum efficiency. Still, however, the present apparatus is relatively easy to operate and to maintain.

BRIEF DESCRIPTION OF THE DRAWINGS

For a fuller understanding of the nature and objects of the invention, reference should be had to the following detailed description, taken in connection with the accompanying drawings, in which.

DESCRIPTION OF THE PREFERRED EMBODIMENT

Figure 1:
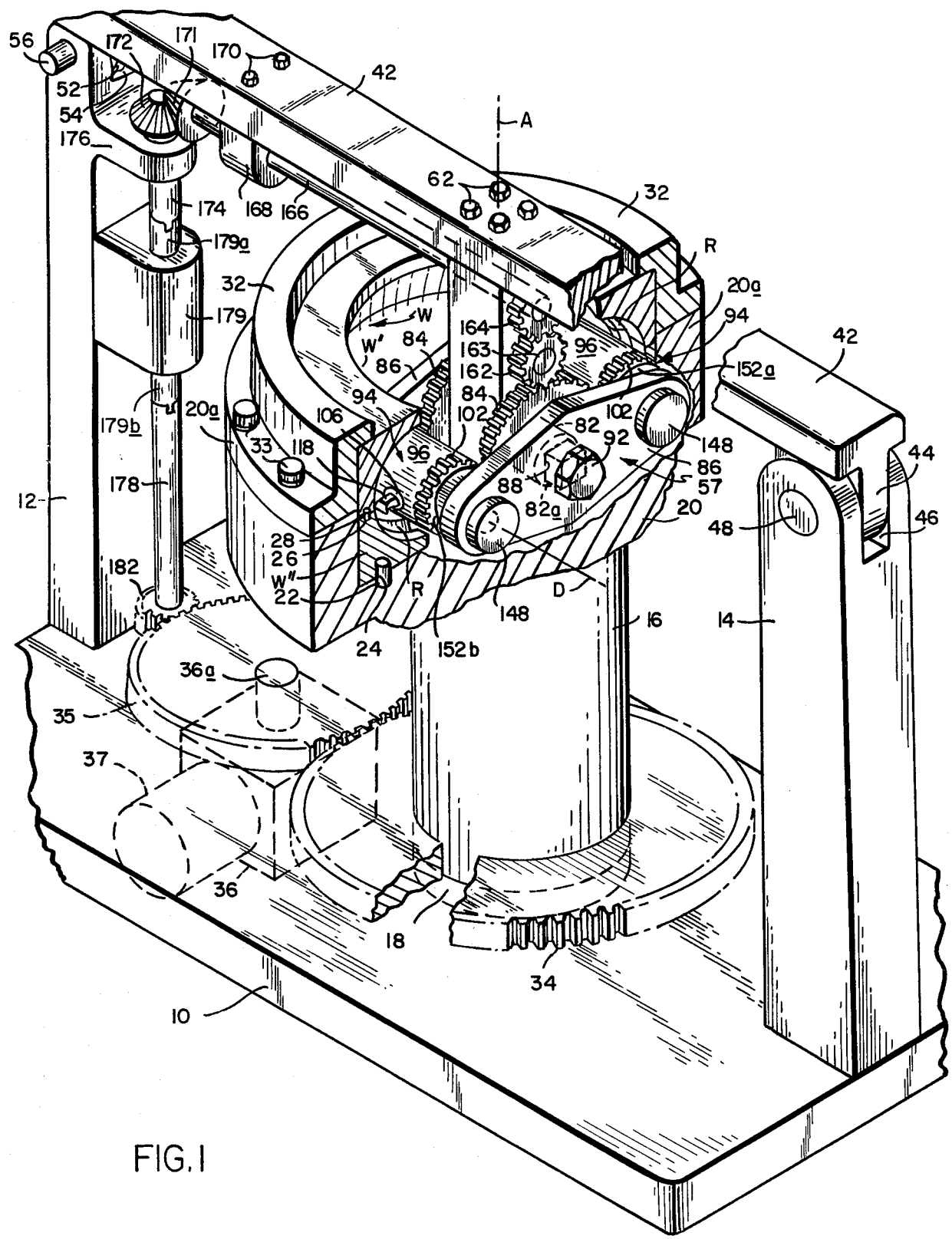
FIG. 1 is a perspective view with parts broken away showing orbital apparatus for forming helical races in a toroidal enclosure embodying the principles of this invention.

Referring to FIG. 1 of the drawings, the present apparatus includes a very sturdy, stable rectangular base 10 supporting a pair of standards 12 and 14 which extend up from the base at each end thereof. A relatively large diameter upstanding pillar 16 has its lower end journaled in a bearing 18 set into base 10 midway between standards 12 and 14. Bearing 18 is both a rotary bearing and a thrust bearing so that pillar 16 is free to rotate relative to the base despite downward forces exerted on the pillar.

Mounted to the top of pillar 16 is a circular worktable 20 of a size adequate to support the desired stator workpiece indicated generally at W.

The illustrated workpiece W comprises an upper section W' and a lower section W" which form the enclosure for a toroidal transmission such as the one illustrated in U.S. Pat. No. Re. 26,476. The worktable 20 has a peripheral upstanding wall or flange 20a which encircles the workpiece W seated on the worktable. One or more locating pins 22 extending up from the floor of the worktable 20 projects into a recess 24 at the underside of the workpiece W to rotatively lock the workpiece to the table. Also, one or more locating pins 26 projects up from the top surface of the workpiece section W" into a correspondingly placed recess 28 at the underside of the upper workpiece section W' so as to fix the relative positions of those two sections.

The workpiece W is secured to the worktable 20 by a flanged circular collar 32 which engages over the top of the upper workpieces section W'. The collar is clamped to the worktable wall 20a by a series of bolts 33 extending through appropriate openings in the collar flange and turned down into threaded passages in the top of the table wall 20a. The clamping engagement of the collar against the workpiece centers the workpiece on the vertical axis A of pillar 16.

Preferably the workpiece sections W' and W" are dropforged of steel so that together they have the proper shape for the workpiece W. More specifically, the two sections together form a toroidal enclosure having a semicircular cross section or profile in which there are rough-formed by the forging process spaced-apart helical grooves or races R. For convenience, we refer to each individual groove length between the top and bottom of the workpiece as a groove or race. It should be understood, however, that such grooves or races are actually segments of races which extend all around the toroidal enclosure. In the transmission with which I am particularly concerned, during the forging process a small groove (not shown) is formed at the bottom of each race or the races are undercut to accommodate any dirt present and to provide a path for lubricating oil.

Figure 2:
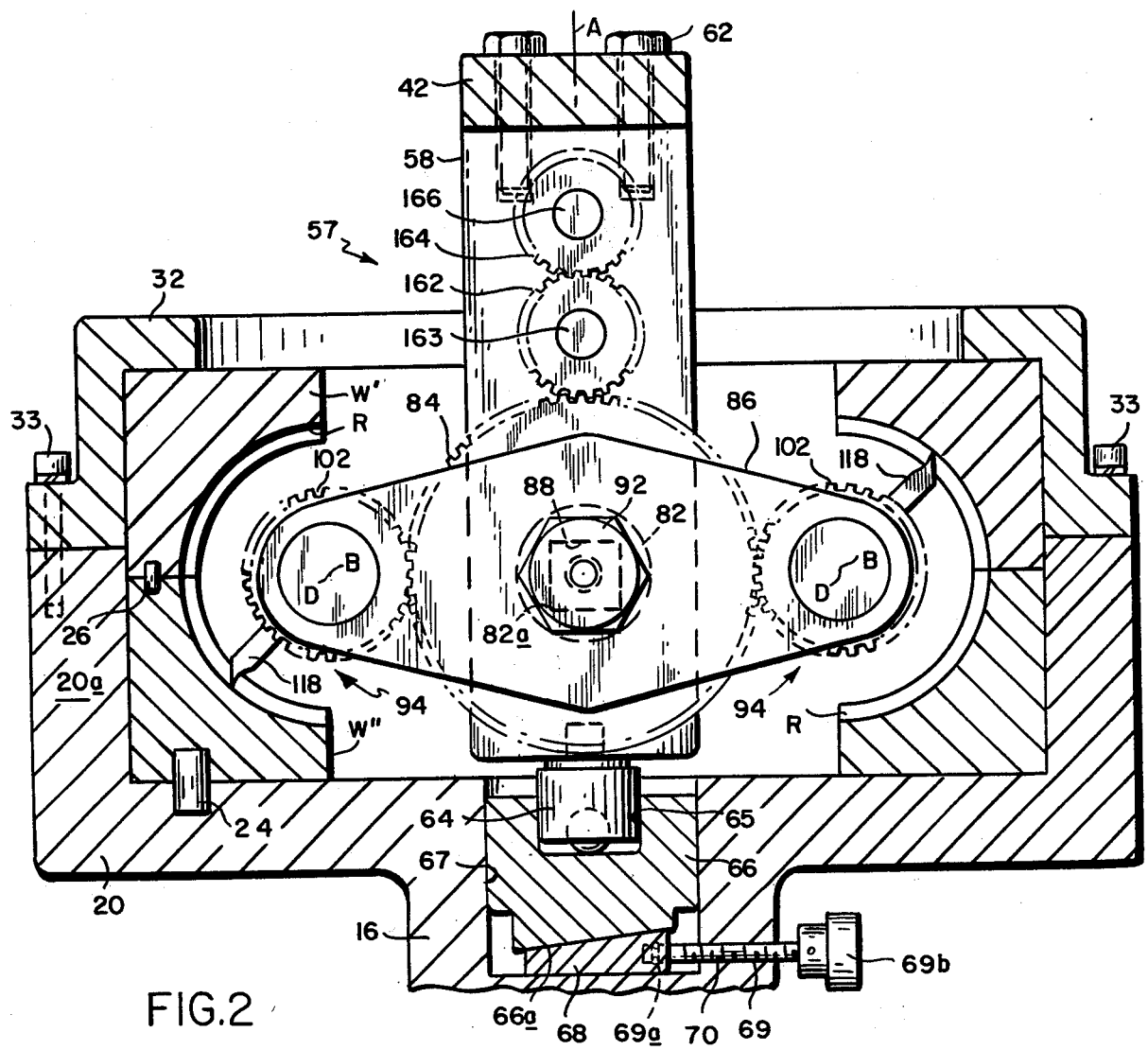
FIG. 2 is a fragmentary sectional view on a larger scale showing a portion of the FIG. 1 apparatus.

The present apparatus gives these races their final shape as will be described presently. When processed in accordance with the technique disclosed herein, the workpiece W forms a toroidal enclosure in whose walls are formed the races R which control the movement of the bearing units in the toroidal transmission. As best seen in FIG. 2, the torodial workpiece has a uniform first radius abut the vertical axis A, and also a uniform smaller radius of curvature about a circular axis B defining a diametric plane perpendicular to axis A which coincides with the interface joint or boundary between the upper and lower stator workpiece sections W' and W".

Still referring to FIG. 1, worktable 20 and consequently workpiece W are rotated about vertical axis A by a large gear 34 encircling pillar 16 near its lower end. Gear 34 meshes with a second gear 35 which is, in turn, rotated by the output shaft 36a of a transmission 36 which is, in turn, driven by an electric motor 37. The transmission and motor are mounted to the underside of base 10 with the transmission shaft 36a extending up to gear 35 through an appropriate opening in the base.

A sturdy beam 42 is positioned directly above worktable 20. One end of the beam, herein the right-hand end, has a depending ear 44 which is received in a slot 46 at the top of standard 14 and pivotally secured there by a pin 48 which extends through the standard and ear. The opposite or left-hand end of beam 42 also is formed with a depending ear 52 which is removably received in a vertical slot 54 on the top of standard 12 and releasably retained there by a pin 56 which extends through the top of the standard and the ear 52. By removing pin 56, the beam 42 can be swung on its pivot pin 48 toward and away from the worktable 20.

Referring now to FIGS. 1 and 2, a tool head shown generally at 57 is suspended from beam 42. The tool head comprises a depending post 58 which is secured on end to the underside of beam 42 intermediate its ends so that the post is centered on the vertical axis A. The post is anchored to the beam by bolts 62 which extend through appropriate openings in the beam and are turned down into threaded passages in the upper end of post 58.

As best seen in FIG. 2, the lower end of post 58 is terminated by a bearing member 64 which functions as both a rotary bearing and a thrust bearing. When the beam 42 is in its normal operating position illustrated in FIG. 1, bearing member 64 is rotatively received in a vertical recess 65 in a plug 66 slidably received in a vertical recess 67 in table 20 and pedestal 16. The underside 66a of plug 66 is tapered. Also positioned between the plug and the bottom of recess 67 is a tapered wedge 68. The wedge can be moved laterally in passage 67 by a screw 69 which is threaded into a passage 70 in the wall of pedestal 16. The screw inner end 69a is rotatively connected to wedge 68, while the shaft outer end is teminated by a knob 69b. Thus by turning knob 69b in one direction or the other, the wedge 68 can be moved to the left or right in passage 67 thereby raising or lowering plug 66 and post 58 relative to the workpiece circular axis B for reasons to be described later. These adjusting movements are small and are accommodated by the connections of the beam 42 to standards 12 and 14.

Still referring to FIGS. 1 and 2, formed integrally with post 58 intermediate its ends are a pair of aligned shafts 82 which project out laterally from opposite sides of the post.

Rotatively mounted on shafts 82 at the opposite sides of post 58 are a pair of identical gears 84. Mounted to the ends of shafts 82 outboard of gears 84 are a pair of elongated, laterally-extending side plates 86. To prevent each plate 86 from rotating on its shaft, the shaft end 82a is squared off and received in a correspondingly square recess 88 formed in each plate 86. Each plate is held on the end of its shaft by a large bolt 92 which extends through an opening in the side plate and is turned down into a threaded passage in the shaft end 82a.

Referring to FIGS. 1 and 2, positioned between corresponding first ends of plates 86 is an orbiting cutting mechanism indicated generally at 94. A similar mechanism 94 may be rotatively mounted between the opposite ends of plates 86 as shown. Thus the cutting head 57 in a given apparatus may include one, two or even more cutting mechanisms 94.

Figure 3:
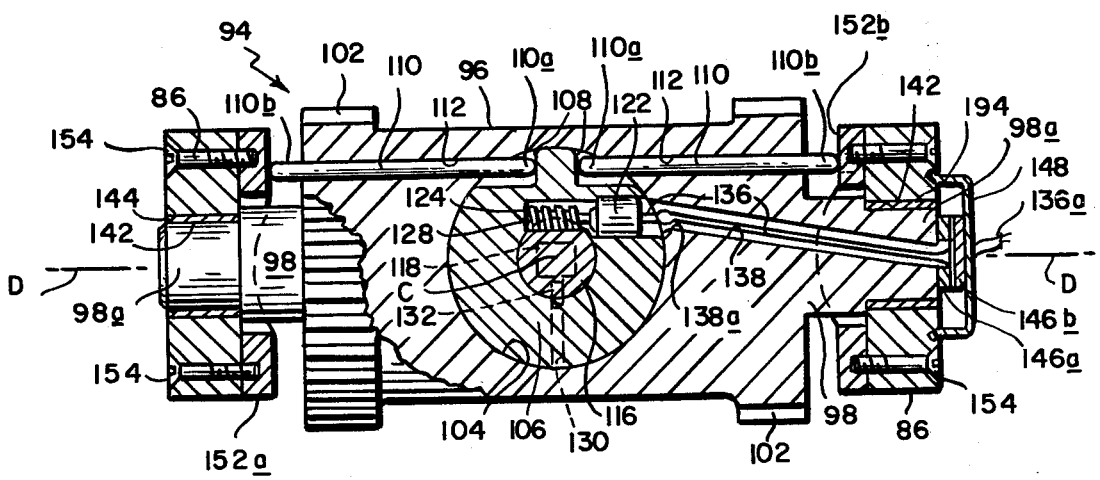
FIG. 3 is a sectional view with parts in elevation on the same scale showing parts of the apparatus in greater detail.

As best seen in FIGS. 1 and 3, each cutting mechanism 94 comprises a generally cylindrical barrel 96 having a pair of hubs 98, the ends of which are necked down at 98a. The end segments of the barrel are formed as gears 102. Formed in the middle of the barrel is a transverse cylindrical passage 104 for slidably receiving a cylindrical tool holder 106.

Figure 4:
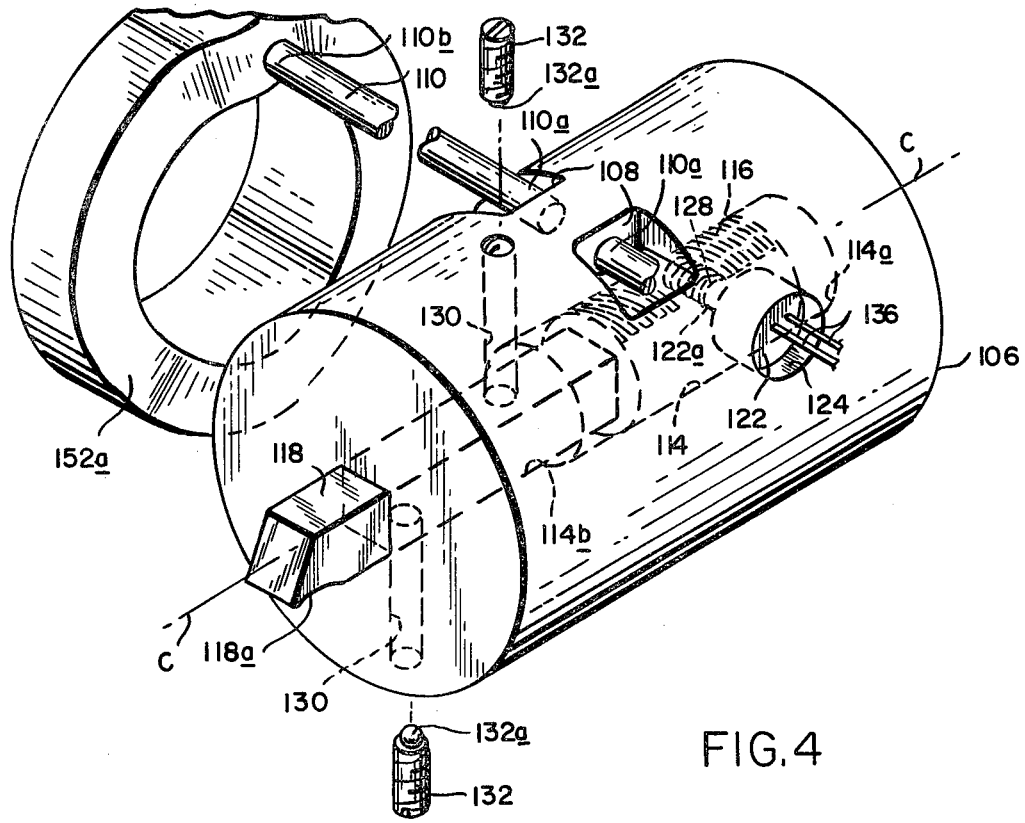
FIG. 4 is an exploded perspective view on a still larger scale showing parts of the FIG. 1 apparatus in still greater detail.

As shown in FIGS. 3 and 4, the top of the tool holder is formed intermediate its ends with a pair of notches 108 which are centered above the holder longitudinal axis C. The holder 106 is rotatable within passage 104 about axis C and this rotation is provided by way of a pair of push rods 110 which are slidably positioned in a pair of aligned axial passages 112 which extend from the opposite ends of barrel 96 into passage 104. The inner ends 110a of the rods engage the tool holder at notches 108 and their outer ends 110b project beyond the opposite ends of the barrel 96. By pushing against the outer end 110b of one or the other of the rods, the tool holder 106 can be rocked or rotated in one direction or the other about axis C within barrel 96. The rods 110 are pushed in a controlled manner as will be described shortly to rock holder 106 back and forth as the cutting mechanism 94 cuts the workpiece W.

Still referring to FIGS. 3 and 4, an axial passage 114 is formed all the way through holder 106. The inner or right-hand segment 114a of that passage as viewed in FIG. 4 is cylindrical, while the outer or left-hand segment 114b has a square or rectangular cross section. Positioned in passage segment 114a is a threaded pusher member 116 having a worm-type thread and positioned in passage segment 114b is a generally rectangular cutting tool 118. The tool inner end extends into passage segment 114a and engages the end of the pusher member 116, while the tool outer or working end 118a projects beyond the end of holder 106. The extent to which the tool projects out of the tool holder depends upon the position of the pusher member 116 in the holder.

The pusher member is moved in one direction or the other along passage segment 114a by a small reversible DC electric motor 122. The motor is situated in a recess 124 within holder 106 so that the motor shaft 122a projects into passage segment 114a. The motor shaft carriers a small worm gear 128 which meshes with pusher member 116. Thus by applying a voltage of one polarity to the motor, the motor turns the worm 128 so that it moves the pusher member 116 toward the left in FIG. 4, thereby advancing the tool 118 out of the holder 106. Conversely, if the motor is energized by a voltage of the opposite polarity, the pusher member is shifted toward the right permitting tool 118 to be retracted or pushed into the tool holder. Of course, the relative diameters of pusher 116 and worm gear 128 and the pitch of their threads are such that the pusher member is not moved toward the right due to the axial forces to which the tool 118 is subjected in use.

Preferably also, to enable tool 118 to slide freely in passage segment 114b when being adjusted, a pair of radial threaded passages 130 are formed in holder 106 at axially spaced locations along passage segment 114b. A pair of screw members 132 having ball bearings 132a rotatively secured at the ends of the screws are turned down into passages 130 and bear against the opposite sides of tool 118.

As best seen in FIG. 3, the motor leads 136 are led out of barrel 96 by way of an axial passage 138 which extends from passage 104 to the outer end of one of the hubs 98, herein the right-hand hub. The inner end of passage 138 adjacent passage 104 is greatly enlarged at 138a to form an alcove to accommodate extra lengths of leads 136 so that the tool holder 106 can rock back and forth as described above without breaking the leads.

Each barrel 96 is rotatively supported between plates 86 and arranged to rotate about an axis D. To this end, the barrel hub ends 98a are journaled in appropriate aligned openings 142 in the plates, each opening 142 being lined with a sleeve bearing 144. To accommodate the rotation of the barrel, the motor leads 136 connect to the slip rings of a commutator section 146a mounted to the end of the right-hand barrel hub 98. A second commutator section 146b is mounted to a cup or cover 148 which is removably secured to the adjacent side plate 86 so that the slip rings of the two commutator sections are in sliding electrical contact when the barrel is rotated.

The electrical leads 136a from commutator section 146b are series-connected to a DC electrical source and an appropriate switch so that the motor 122 can be caused to rotate in one direction or the other at the correct times during operation of the apparatus.

Referring now to FIGS. 1, 3 and 4, the push rods 110 and more specifically their ends 110b are pushed axially in one direction or the other by a pair of annular cams 152a and 152b positioned between the opposite ends of barrel 96 and the adjacent end plates 86. The cams are removably held in place by bolts 154 (FIG. 3) extending through appropriate openings in the plates and turned down into threaded passages in the cams. The faces of the cams 152a and 152b opposite have more or less the same profile around their circumferences except that the two profiles are 180° out of phase. In other words, as viewed in FIG. 3, when a raised segment of cam 152a pushes the left-hand rod 110 toward the right, thereby rotating tool holder 106 in the clockwise direction about its axis C, the right-hand rod 110 is following a valley in the cam 152b so that it allows that holder rotation. Conversely, when the barrel 96 is rotated to bring the right-hand push rod 110 opposite a raised segment of the cam 152b, the left-hand push rod is disposed opposite a valley in cam 152a so that tool holder 106 can rock in the counterclockwise direction as viewed in FIG. 3. As will be described in more detail later, the profiles of cams 152a and 152b are arranged so that the cutting tool 118 of each cutting mechanism 94 is rocked back and forth about its axis C as each barrel 96 rotates about its axis D. Of course, the cutting tool 118 of each cutting mechanism 94 only contacts the workpiece W during approximately half of each revolution of barrel 96. Therefore, the face sectors of the cams 152a and 152b which are engaged by the push rods 110 during that return portion of the barrel revolution can be flat so that there is no rotary or rocking motion imparted to the tool holder 106. Indeed, the cams can be C-shaped, with their gaps facing gears 84 (FIG. 1) so that they can be removed easily from the plates 86 and replaced with differently profiled cams when it becomes desirable to change the shape of grooves R.

Referring now to FIG. 1, the two cutting mechanisms 94 are rotated in opposite directions by gears 84. Those gears mesh with a pair of idlers 162 rotating on stub shafts 163 at opposite sides of post 58. Gears 162 also mesh with a pair of gears 164 positioned on opposite sides of post 58 and mounted to the end of a long shaft 166 journaled in post 58. The opposite end segment of that shaft is journaled in a depending ear 168 secured by bolts 170 to the underside of beam 42 near the left-hand end thereof. The free end of the shaft is terminated by a bevel gear 171.

Gear 171 meshes with a similar bevel gear 172 mounted to the upper end of a vertical shaft 174. Shaft 174 is journaled in an ear 176 projecting out from the side of standard 12. The lower end of shaft 174 connects with the output shaft 179a of an electrically operated clutch 179. The clutch input shaft 176b is rotated by a shaft 178 which extends down adjacent to standard 12 and is terminated at its lower end by a small spur gear 182 which meshes with gear 35. Thus, when gear 35 is rotated by motor 37 and clutch 179 is engaged, the cutting mechanisms 94 are rotated in synchronism with the rotation of the worktable 20 and the stator workpiece W thereon. On the other hand, when the clutch 179 is disengaged, the worktable may be rotated independently of the cutting mechanisms.

To use the apparatus, pin 56 is removed to release the left-hand end of beam 42 so that it can be swung up away from worktable 20 to raise the tool head 57. Then the lower workpiece section W'' is properly located on the worktable using pin 22. While the head 57 is in its raised position, first the collar 32 and then the upper workpiece section W' are positioned on the head above the cutting mechanisms 94. This may be done by tilting or cocking those components and inserting first one cutting mechanism 94 and then the other such mechanism through the central openings in those components.

Next, with the tool 118 in their retracted positions, the beam 42 is lowered and locked in position by pin 56. When the beam 42 is secured in place, the two bevel gears 171 and 172 are in meshing engagement. Following this, the upper workpiece section W' is properly oriented relative to the lower section using pin 28 and the collar 32 is clamped to the worktable by turning down bolts 33 thereby tightly clamping the two workpiece sections together and to the worktable. When the beam and workpiece are in their locked and clamped positions, the longitudinal axis of post 58 coincides with the workpiece axis A as best seen in FIG. 2.

Next, using the adjusting screw 69 (FIG. 2), the post 58 is raised or lowered as required to locate the rotary axes D of barrels 96 so that they lie in the diametric plane defined by the circular axis B. That vertical adjustment is quite small in relation to the lengths of beam 42 and post 58 so that it has an insignificant effect on the perpendicularity of the post. In this position of the tool head 57, the axes of rotation D of the cutting mechanism barrels 96 are tangent to the circular axis B at diametrically opposite locations on that axis. Thus, when those barrels are rotated, each tool 118 swings in a circular path about the corresponding point of tangency.

At this point, the relative positions of the tool holders 106 and workpiece W are set. This is accomplished by energizing motor 37 with clutch 179 engaged until the retracted tools are oriented vertically, one pointing up and the other pointing down. The one tool is now located adjacent the inner edge of the upper workpiece section W' and the other tool is positioned at the inner edge of the lower workpiece section W''' at the diametrically opposite side of the workpiece. Thus, each tool is in position to commence inscribing a race.

Following this, the clutch 179 is disengaged and the worktable 20 is rotated to position the entrance or exit end of a roughly formed race opposite each tool and the motor 122 in each cutting mechanism is energized to extend the associated tool 118 so that its working end 118a is in position to engage the race wall when the cutting operation commences. After the clutch 179 is reengaged, the apparatus is in condition to work on the stator workpiece W.

In the present example, the apparatus is cutting helical races R in a toroidal transmission stator. In that workpiece, the pitch of each race R is such that the workpiece and hence the worktable 20 must be turned, say, 5°, as each cutting mechanism 94 inscribes each race R. Consequently, the diameters of the various gears in the apparatus are such that the barrel 96 of each cutting mechanism 94 rotates 180° as the worktable and workpiece turn exactly 5°. Furthermore, before the commencement of each pass of each tool 118 along a race convolution, the tool 118 is advanced out of its holder so that the tool removes a relatively small amount of material (e.g. 0.001 inch) from each unfinished race R during each pass of the tool along a race.

When the apparatus starts operating on the workpiece W, one tool 118 enters a race R at the top of the workpiece, while the other tool enters a more or less diametrically opposite race at the bottom of the workpiece. As the workpiece turns about axis A, each tool 118a working end is swung about axis D from the entrance end R' of the race which it is cutting toward the race midpoint R'' at the interfacial plane between the two workpiece sections W' and W'''.

Figure 5:
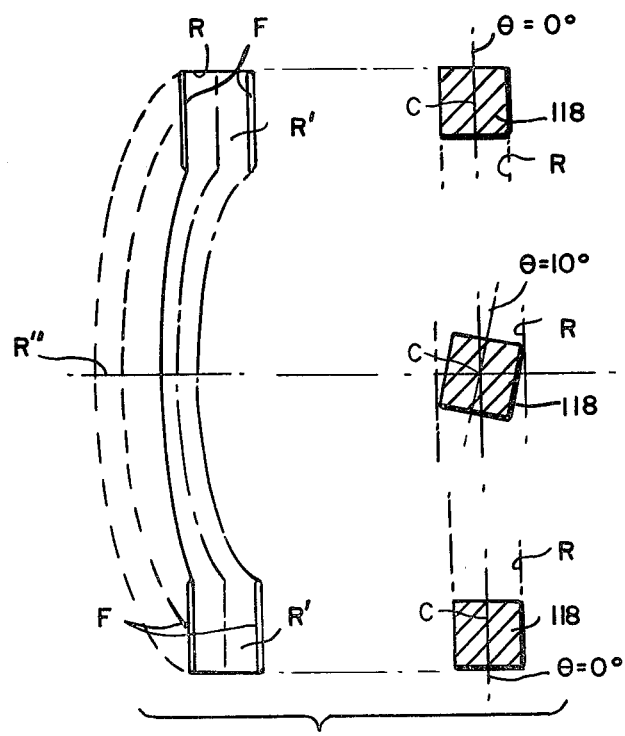
FIG. 5 is a diagrammatic view illustrating the operation of the FIG. 1 apparatus.

As best seen in FIG. 5, the cams 152a and 152b are shaped so that when each tool 118 enters a race (either at the upper or lower end thereof), the tool is oriented at a reference angle (e.g. 0° wherein the top and bottom surfaces of the tool are horizontal). As each tool moves along its race, the tool is rotated in one direction about its axis C from that reference angle toward a selected angle $\theta$, the latter angle being achieved when the tool reaches the race midpoint R''. When the tool is rotated thusly, it cuts a progressively wider swath along the race R.

Then, as the tool 118 is swung from that race midpoint R'' toward the exit end R''' of the race (at the lower or upper end thereof), the tool is rotated in the opposite direction about its axis C from that selected angle $\theta$ to the reference angle (0°). Consequently the tool cuts a progressively narrower swath along the race from point R'' to the exit end of the race.

Resultantly, the apparatus forms each race or groove R with a geometry which never varies when measured rectilinearly to the tangent of the lead angle of the race. That tangent increases steadily between the beginning of each race at the entrance end thereof to the midpoint R'' of the race and then steadily declines toward the exit end of each race. In a typical case, each tool 118 may be rotated about axis C $\pm 10°$ relative to its 0° reference angle as shown in FIG. 5.

By the end of each pass of each tool 118 along a groove, the tool has returned to its 0° reference angle. After each tool contacts rotates out of contact with the workpiece, it remains at its 0° angle since the sectors of cams 152a and 152b corresponding to that return leg are flat. As each barrel 96 is rotated approximately 180° with the associated tool 118 out of contact with the workpiece, the worktable 20 and workpiece W are turned exactly 5°. Consequently, each tool is in position to enter the next roughly formed groove or race R in the workpiece.

This process continues as the worktable 20 and workpiece W turn continuously, while the cutting mechanisms 94 revolve continuously in synchronism until the worktable has turned 180°. At that point, all of the unfinished races in the stator workpiece have been subjected to one pass of a tool 118.

If a single pass of the tool is sufficient to give each race the correct geometric cross section, the process is complete. If, on the other hand, additional cutting action is required to finish the races, the tool 118 in each cutting mechanism 94 is advanced out of its holder 106 a selected distance (e.g. 0.001 inch) by energizing the associated motor 122 for a determined time interval during the return rotation of the tool to its initial position at the top or bottom of the next race. The motor can be controlled manually or automatically using an appropriate timing switch (not shown). Thus, in a given workpiece, each race R may be subjected to a plurality of cuts by a tool 118 before it assumes its proper dimensions and cross sectional shape.

Of course, after the race profiling process is completed, the workpiece W is removed from the apparatus 10 by unclamping the workpiece sections from the worktable and lifting the tool head 57 following a procedure which is the reverse of the one described above when setting up the workpiece for processing.

In one embodiment of my apparatus, the cams 152a and 152b are profiled to deliberately alter the tilt or rock angle of each cutting tool 118 about its axis C to slightly widen or flare the entrance and exit ends R' of each race or groove R as shown at F in FIG. 5. That is, the cams 152a and 152b are shaped so that the tool 118 is oriented initially so that its working end makes a wide swath at the entrance end R' of each race and then is turned relatively rapidly about its axis C toward its reference angle so that the race width is quickly decreased as shown at F in FIG. 5. From that point on until the tool reaches the race midpoint R'', the tool is rotated from the reference angle toward the selected angle $\theta$ to produce the uniform groove geometry described above. At that point, the tool is turned about axis C in the oppoiste direction to the reference angle while the tool inscribes the remainder of the race. Then, just before the tool exits the race, it is rotated rapidly in the original direction to cut a flare F at the exit end of the race.

The widening or flaring of the race ends R' as aforesaid ensures that when the stator workpiece is incorporated into a transmission, the fingers or bearings of each rotary bearing unit in that transmission will enter and exit each race smoothly and without any shock or bind-up. That, in turn, ensures that the output shaft of such a transmission transmits torque in a smooth and continuous fashion.

Since both the upper and lower stator section W' and W" are formed at exactly the same time, there is no problem of misalignment or discontinuities at the interface joint between the two stator sections (i.e. at R") when they are incorporated into a transmission. Consequently, there is assured continuous, geometrically precise surfaces in the groove or race walls which allow maximum loading of the transmission planetary bearing units as those units roll along those grooves. Consequently, the bearings or fingers of each such planetary bearing unit contact the races with equal force. Resultantly, the bearing units share equally the load developed in the transmission due to the input torque, which is essential to operate the transmission with maximum load and efficiency.

Using the present technique, then, toroidal transmission enclosures or stators having spaced-apart helical races can be formed very efficiently on a continuous production basis. Furthermore, since the present apparatus is semi-automatic and demands no particular skill of the operator, such enclosures can be made on a large scale at relatively low cost as compared to those made using prior apparatus of this general type.

It will thus be seen that the objects set forth above, among those made apparent from the preceding description, are efficiently attained, and, since certain changes may be made in the above method and in the above construction without departing from the scope of the invention, it is intended that all matter contained in the above description or shown in the accompanying drawings be interpreted as illustrative and not in a limiting sense.

It is also to be understood that the following claims are intended to cover all of the generic and specific features of the invention herein described.

What is claimed as new and desired to be secured by Letters Patent of the United States is:

1. The method of forming helical grooves in a workpiece defining a toroidal enclosure having a generally semicircular cross section, an axis of symmetry, and a circular axis perpendicular to the axis of symmetry and defining a diametric plane through the enclosure comprising the steps of
   A. unidirectionally rotating the workpiece continuously about a first axis corresponding to said axis of symmetry;
   B. positioning a cutting tool adjacent to the workpiece so that its cutting edge engages the enclosure wall;
   C. unidirectionally rotating the cutting tool about a second axis perpendicular to the first axis and coincident with the circular axis continuously in synchronism with the rotation of the workpiece so that the cutting tool inscribes helical grooves in the enclosure wall, said second axis remaining in said diametric plane throughout the forming operation; and
   D. continuing the synchronized rotations of the tool and workpiece so as to form a series of said grooves all around the enclosure wall which comprise successive convolutions of a single helix with a precise cross section.

2. The method defined in claim 1 and including the additional step of rocking the tool through a selected angle in one direction about its longitudinal axis as the tool is swung from the entrance end of each groove to said diametric plane and then rocking the tool through said angle in the opposite direction about its said axis as the tool is swung from said diametric plane to the exit end of each groove so that the groove geometry along the groove does not vary when measured rectilinearly to the tangent of the lead angle of the groove.

3. The method defined in claim 1 or 2 and including the additional step of advancing the cutting tool so as to increase the distance between the tool cutting edge and the second axis after completion of a said series of grooves and when the tool is out of contact with the workpiece.

4. Apparatus for cutting substantially parallel helical grooves in a workpiece defining a toroidal enclosure having a generally semicircular cross section, an axis of symmetry and a circular axis perpendicular to the axis of symmetry and defining a diametric plane through the envelope, said apparatus comprising
   A. means for positioning the workpiece;
   B. means for rotating the workpiece positioning means continuously in one direction about a first axis corresponding to said axis of symmetry;
   C. means for positioning a cutting tool adjacent the workpiece so that the tool cutting edge can cut grooves in the wall of the envelope;
   D. means for continuously rotating said tool positioning means about a second axis coincident with said circular axis, wherein said second axis remains in said diametric plane throughout the forming operation; and
   E. means for synchronizing the workpiece positioning means and the tool positioning means so as to maintain a cutting tool positioned by the tool positioning means at a constant attack angle against the workpiece positioned by the workpiece positioning means whereby the tool moves along a continuous helical path relative to the workpiece so as to form a series of grooves which are successive convolutions of a single helix with a precise cross section in the workpiece.

5. The apparatus defined in claim 4 and further including
   A. means for rocking the tool through a selected angle in one direction about its own longitudinal axis as the tool is swung from the entrance end of each groove to said diametric plane; and
   B. means for rocking the tool through said selected angle in the opposite direction about its longitudinal axis as the tool is rotated from said diametric plane to the exit end of each groove so that said groove geometry does not vary when measured rectilinearly to the tangent of the lead angle of the groove.

6. The apparatus defined in claim 4 or 5 and further including means for advancing the tool out of the positioning means so as to increase the distance between said second axis and the tool cutting edge after completion of the groove series and when the tool is out of contact with the workpiece.

7. The apparatus defined in claim 4 and further including means for decoupling the means for rotating the workpiece and the means for rotating the tool positioning means so that they do not rotate in synchronism.

8. The apparatus defined in claim 4 wherein the tool positiong means comprise
   A. support means located above the workpiece positioning means; and
   B. a tool head depending from the support means and projecting into the toroidal envelope defined by the workpiece.

9. The apparatus defined in claim 8 wherein the tool head comprises
   A. a rotary member;
   B. means for supporting said rotary member for rotation within the workpiece envelope about an axis coincident with the circular axis of the workpiece;
   C. a tool support fixture;
   D. means for mounting the support fixture to said rotary member so that said fixture can be rocked to and fro about an axis perpendicular to the rotary member axis; and
   E. means mounted to the rotary member for rocking the tool support fixture about its rocking axis in synchronism with the rotation of the rotary member.

10. The apparatus defined in claim 9 wherein the rocking means include
    A. rotary cam means positioned coaxially with the rotary member; and
    B. cam follower means extending between the cam means and the tool support fixture.

11. The apparatus defined in claim 9 and further including means for adjusting the vertical position of the tool head relative to the workpiece positioning means.

* * * * *